US012541444B2

(12) United States Patent
Sethi et al.

(10) Patent No.: US 12,541,444 B2
(45) Date of Patent: Feb. 3, 2026

(54) PROACTIVE METHOD TO PREDICT SYSTEM FAILURE AND RECOMMEND USER FOR AN UNINTERRUPTED CONNECTION WHILE REMOTELY MANAGING DEVICES

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 122 days.

(21) Appl. No.: 18/181,790

(22) Filed: Mar. 10, 2023

(65) Prior Publication Data

US 2024/0303170 A1    Sep. 12, 2024

(51) Int. Cl.
*G06F 11/00* (2006.01)
*G06F 11/07* (2006.01)
*G06F 11/30* (2006.01)

(52) U.S. Cl.
CPC ...... *G06F 11/3065* (2013.01); *G06F 11/0751* (2013.01); *G06F 11/079* (2013.01); *G06F 11/3055* (2013.01)

(58) Field of Classification Search
CPC ............... G06F 11/0751; G06F 11/079; G06F 11/3055; G06F 11/3065; G06F 11/3409; G06F 11/3452; G06N 20/00
See application file for complete search history.

(56) References Cited

U.S. PATENT DOCUMENTS

| | | | |
|---|---|---|---|
| 5,781,434 A * | 7/1998 | Tobita | H04L 12/12 700/12 |
| 6,229,538 B1 | 5/2001 | Mcintyre et al. | |
| 6,671,802 B1 | 12/2003 | Ott | |
| 6,757,838 B1 | 6/2004 | Chaiken | |
| 7,590,981 B2 | 9/2009 | Gupta et al. | |
| 8,078,448 B1 | 12/2011 | Wohlberg et al. | |
| 8,090,819 B1 | 1/2012 | Ramamurthy | |
| 9,086,941 B1 | 7/2015 | Siegel | |
| 9,444,717 B1 | 9/2016 | Aithal | |
| 10,732,957 B2 * | 8/2020 | Dattatri | G06F 8/65 |
| 11,128,701 B1 | 9/2021 | Virtuoso | |
| 2006/0026415 A1 | 2/2006 | Chen | |
| 2006/0029097 A1 | 2/2006 | Mcgee et al. | |
| 2008/0148031 A1 | 6/2008 | Brown | |

(Continued)

*Primary Examiner* — Elmira Mehrmanesh
(74) *Attorney, Agent, or Firm* — Chamberlain, Hrdlicka, White, Williams & Aughtry; Aly Z. Dossa (57) ABSTRACT

Embodiments described herein relate to a method for recommending changes to a system that includes a remote access controller (RAC). The one or more embodiments of the invention described above may improve the functioning of an information handling system (IHS) and the ability to use an RAC for troubleshooting and correcting problems with the IHS, even when the IHS is off-line or experiencing an OS failure. In one or more embodiments of the invention a bare metal orchestrator, which is separate from the IHS, monitors the IHS and uses machine learning to determine when to switch the RAC from shared mode to dedicated mode, so that the RAC is in a dedicated mode when it is probable that the IHS will fail.

7 Claims, 5 Drawing Sheets

(56) References Cited

U.S. PATENT DOCUMENTS

| | | |
|---|---|---|
| 2008/0215910 A1 | 9/2008 | Gabriel |
| 2009/0103430 A1 | 4/2009 | Wang |
| 2011/0035498 A1 | 2/2011 | Shah et al. |
| 2011/0113224 A1 | 5/2011 | Isshiki et al. |
| 2011/0225274 A1 | 9/2011 | Dvorkin |
| 2012/0110370 A1* | 5/2012 | Havivi ............... G06F 11/0706 707/827 |
| 2012/0324469 A1 | 12/2012 | Nishihara et al. |
| 2013/0046911 A1* | 2/2013 | Mine .................. G06F 11/3055 710/267 |
| 2015/0081829 A1 | 3/2015 | Maity |
| 2015/0169291 A1 | 6/2015 | Dube |
| 2015/0278219 A1 | 10/2015 | Phipps |
| 2016/0011880 A1 | 1/2016 | Maity |
| 2016/0162280 A1 | 6/2016 | Murayama et al. |
| 2017/0155573 A1* | 6/2017 | Khemani ............ H04L 41/0663 |
| 2018/0102981 A1 | 4/2018 | Kurtzman et al. |
| 2018/0113728 A1 | 4/2018 | Musani et al. |
| 2018/0152341 A1 | 5/2018 | Maeda et al. |
| 2018/0203739 A1 | 7/2018 | Brady |
| 2018/0232458 A1 | 8/2018 | Fitzgerald |
| 2018/0267832 A1 | 9/2018 | Biener |
| 2019/0318039 A1 | 10/2019 | Nozhchev |
| 2019/0391798 A1 | 12/2019 | Farrell |
| 2020/0007629 A1 | 1/2020 | Tse et al. |
| 2020/0076717 A1 | 3/2020 | Rantzau et al. |
| 2020/0104113 A1 | 4/2020 | Grill et al. |
| 2020/0156243 A1 | 5/2020 | Ghare et al. |
| 2020/0311573 A1 | 10/2020 | Desai |
| 2020/0403985 A1 | 12/2020 | Mahadevan |
| 2021/0089325 A1 | 3/2021 | Suryanarayana |
| 2022/0019498 A1* | 1/2022 | Ranganathan ............ G06F 8/65 |
| 2022/0019561 A1* | 1/2022 | Jose ....................... G06F 1/3206 |
| 2022/0036224 A1* | 2/2022 | Sethi ................. G06F 18/24155 |
| 2022/0206877 A1* | 6/2022 | Sohail ................ G06F 11/3447 |
| 2022/0345524 A1 | 10/2022 | Mitkar et al. |
| 2022/0383324 A1 | 12/2022 | Sheshadri |
| 2023/0029888 A1 | 2/2023 | Wang |
| 2023/0117047 A1 | 4/2023 | Francis |
| 2023/0168929 A1 | 6/2023 | Wadekar |
| 2023/0236844 A1 | 7/2023 | Sethu |
| 2023/0239195 A1 | 7/2023 | Mirgorodskiy et al. |
| 2023/0350717 A1 | 11/2023 | Neate |
| 2024/0032081 A1 | 1/2024 | Sun |
| 2024/0070050 A1 | 2/2024 | Pahwa |
| 2024/0184682 A1 | 6/2024 | Vudathu |

\* cited by examiner

PROACTIVE METHOD TO PREDICT SYSTEM FAILURE AND RECOMMEND USER FOR AN UNINTERRUPTED CONNECTION WHILE REMOTELY MANAGING DEVICES

BACKGROUND

In an enterprise environment, a system might be running multiple applications that are either working together or dependent on each other. The system may take the form of a datacenter and comprise of many hardware elements/devices such as processors, storage devices, network devices, and other devices/elements. Once computing systems are deployed, inevitable problems occur with the computing systems requiring correction.

SUMMARY

In general, certain embodiments described herein relate to a method for managing an information handling system (IHS). Telemetry and system logs are retrieved from a remote access controller (RAC) that is part of the information handling system. From the telemetry and system logs, the method determines a predetermined event. If the predetermined event is currently occurring, the method determines if the remote access controller is in a dedicated mode. If it is verified that the remote access controller is not in a dedicated mode, a recommendation is transmitted to a user of the information handling system to switch the remote access controller to a dedicated mode.

In general, certain embodiments described herein relate to a non-transitory computer readable medium comprising computer readable program code, which when executed by a computer processor enables the computer processor to perform a method for managing an information handling system. Telemetry and system logs are retrieved from a remote access controller (RAC) that is part of the information handling system. From the telemetry and system logs, the method determines a predetermined event and if the predetermined event is currently occurring, the method determines if the remote access controller is in a dedicated mode. If it is verified that the remote access controller is not in a dedicated mode, a recommendation is transmitted to a user of the information handling system to switch the remote access controller to a dedicated mode.

In general, certain embodiments described herein relate to a system comprising: a remote access controller and a bare metal orchestrator. The bare metal orchestrator comprises at least one processor and at least one memory. The at least one memory includes instructions, which when executed by the processor, perform a method for managing an information handling system. Telemetry and system logs are retrieved from a remote access controller (RAC) that is part of the information handling system. From the telemetry and system logs, the method determines a predetermined event. If the predetermined event is currently occurring, the method determines if the remote access controller is in a dedicated mode. If it is verified that the remote access controller is not in a dedicated mode, automatically switching the remote access controller to a dedicated mode.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A, and a second element labeled as N. This labeling convention means that the data structure may include any number of the elements. A second data structure, also labeled as A to N, may also include any number of elements. The number of elements of the first data structure, and the number of elements of the second data structure, may be the same or different.

In general, embodiments of the invention relate to a system that includes one or more information handling systems (IHS) which may take the form of a server or other computational devices that are part of a data center, edge, cloud, or other commercial or enterprise/academic/scientific computational system. In one or more embodiments of the invention, the one or more information handling systems include a remote access controller (RAC) that allows for managing an IHS's hardware remotely. This RAC, in one or more embodiments of the invention, may configure the associated hardware elements as well as other components (software and firmware) even when the IHS is turned off.

The RAC may be configured in several modes including a dedicated mode and a shared mode. For critical hardware, generally the RAC is placed in the dedicated mode. This is because it is the best practice, as it allows out of band management to be completely segmented. In this mode, connectivity is not interrupted when a system reboots or hangs. In shared mode, the RAC shares the NI with the host operating system; as such, if the host operating system hangs the RAC may not be able to access to the NI to perform out of band management.

In one or more embodiments of the invention, a recommendation engine, a bare metal orchestrator (which is separate from the IHS), monitors the IHS and uses machine learning to determine when to switch the RAC from shared mode to dedicated mode so that the RAC is in a dedicated mode when it is probable that the IHS will fail. In addition, the bare metal orchestrator makes recommendations for configuring the necessary cabling, as well as other settings. Having the RAC switch from a shared mode to a dedicated mode when system and/or operating system (OS) failure is probable allows the RAC to be available even when the OS and/or other elements of the IHS are not functioning.

The following describes various embodiments of the invention.

Figure 1A:
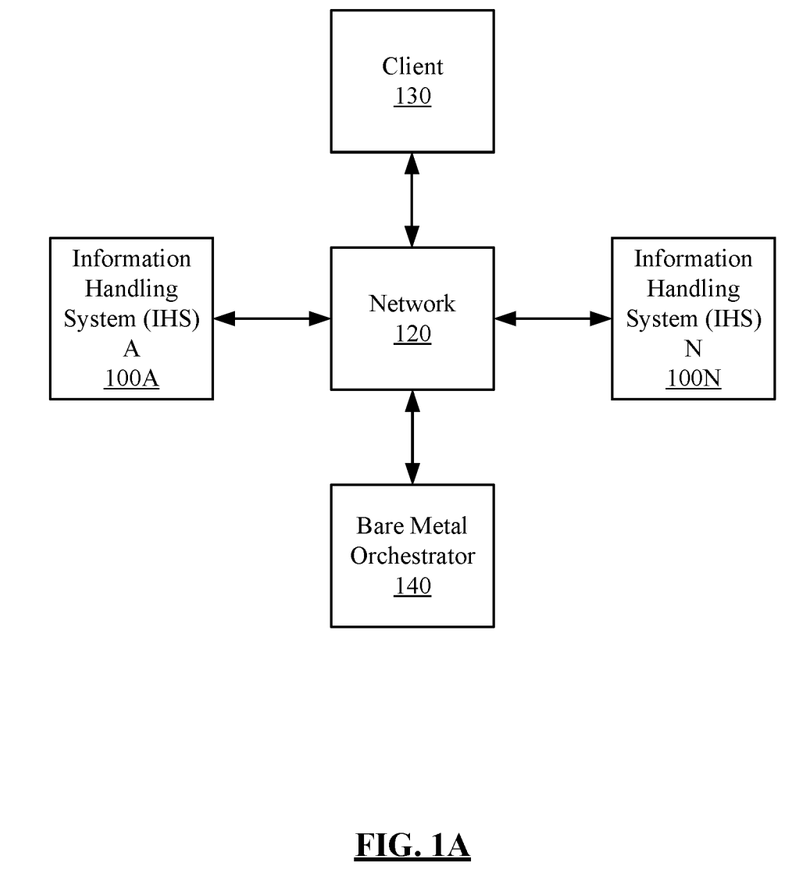
FIG. 1A shows a diagram of a system in accordance with one or more embodiments of the invention.

FIG. 1A shows a diagram of a system that performs the claimed methods in one or more embodiments of the invention. The system includes a plurality of computational devices such as, but not limited to information handling systems (IHSs) (e.g., 100A-100N), a bare metal orchestrator (140), one or more clients (e.g., 130). Each of the computational devices are connected to a network (120) such as, but not limited to: the Internet or local/private networks. The specific number and type of computational systems shown in FIG. 1A are only representative and a subset of the system, and each component will be described below in more detail.

In one or more embodiments of the invention, the information handling systems (IHSs) (e.g., 100A-100N) perform workloads and provide services to clients (e.g., 130) and/or other entities (not shown) in the system illustrated in FIG. 1A. In one or more embodiments of the invention, the IHSs may take the form of production hosts, servers, and other similar computational devices. The IHSs may be a part of or may form a data center, or a node of a datacenter or other large grouping of computational devices (such as, but not limited to, edge and cloud systems).

The IHSs (e.g., 100A-100N) may comprise of a plurality of devices (e.g., 100A-100N) such as, but not limited to, data centers, personal computers (PCs), laptops, and any other computation device that may have its hardware upgraded and/or replaced. For simplicity, the system shown in FIG. 1A only shows two devices (100A, 100N), however, they are only representative and a subset of the system. The system may include any number of datacenters that are geographically dispersed (for example, in a non-limiting example, one or more located on each continent). Further, in one or more embodiments of the invention, one or more IHSs (e.g., 100A-100N) may be located at the same facility and/or one or more IHSs (e.g., 100A-100N) located remotely in other locations that are geographically dispersed. The IHS (e.g., 100A) will be described in more detail with regards to FIGS. 1B and 1C.

The IHSs (e.g., 100A-100N) may further comprise the functionality to perform computer implemented services for users (clients (e.g., 130)). The computer implemented services may comprise of, for example, database services, electronic mail services, data processing services, web services, etc. The IHSs (e.g., 100A-100N) may also include means to store data and/or provide the data to clients (130) and other entities.

Figure 3:
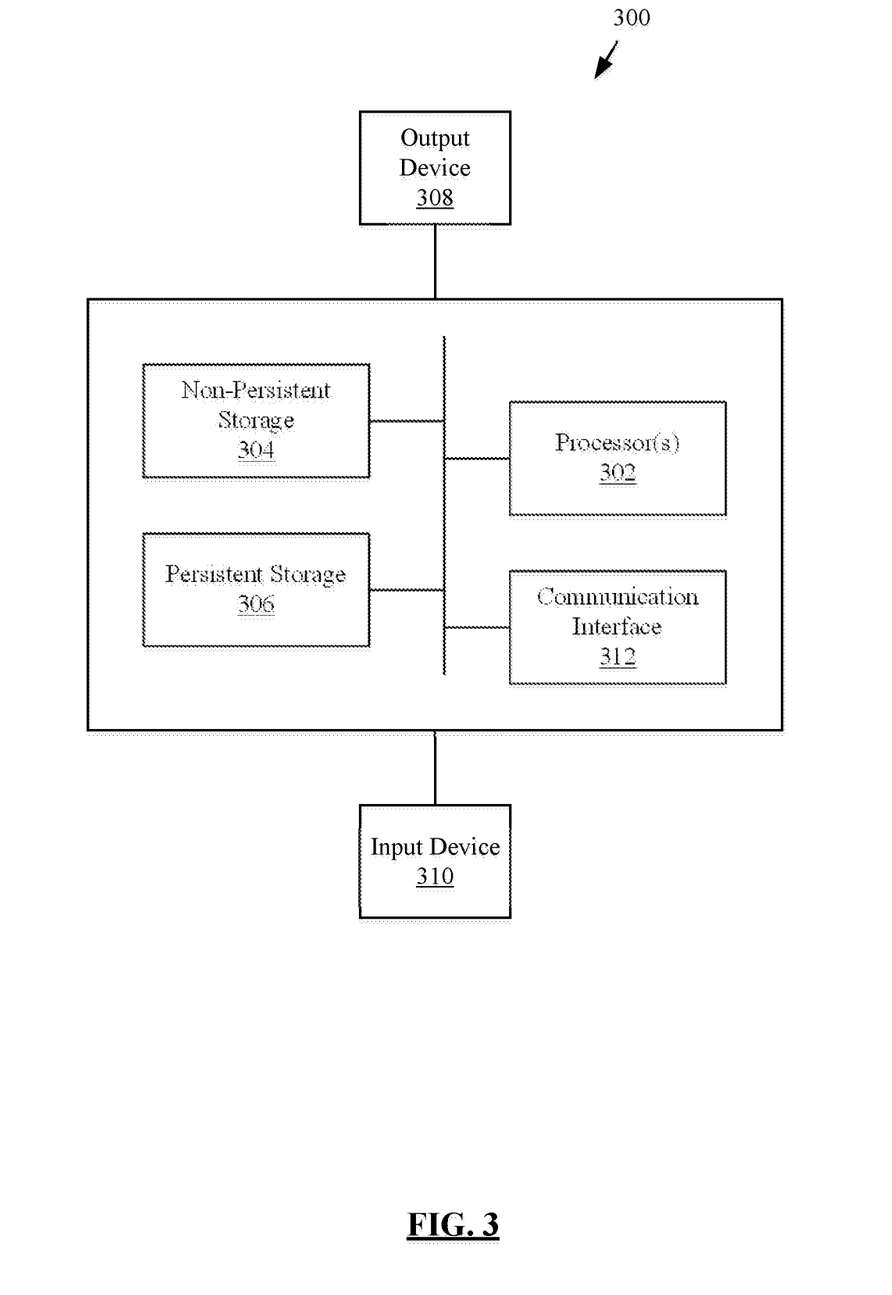
FIG. 3 shows a diagram of a computing device in accordance with one or more embodiments of the invention.

In one or more embodiments of the invention, the IHSs (e.g., 100A-100N) are implemented as computing devices (see e.g., FIG. 3). A computing device may be, for example, a mobile phone, tablet computer, laptop computer, desktop computer, server, distributed computing system, or cloud resource. The computing device may comprise of one or more processors, memory (e.g., random access memory), and persistent storage (e.g., disk drives, solid state drives, etc.). The computing device may comprise of instructions stored on the persistent storage that, when executed by the processor(s) of the computing device, cause the computing device to perform the functionality of the IHSs (e.g., 100A-100N) described throughout this application.

In one or more embodiments of the invention, the IHSs (e.g., 100A-100N) are implemented as logical devices. The logical devices may utilize the computing resources of any number of computing devices and thereby provide the functionality of the IHSs (e.g., 100A-100N) described throughout this application.

In one or more embodiments of the invention, the IHSs (e.g., 100A-100N) interact via a network (120) with a bare metal orchestrator (140), clients (130), and other IHSs (e.g., 100A-100N). The network (120) may take any form, including any combination of wireless and/or wired networks. The network (120) may be a local area network (LAN), or a wide area network (WLAN), including the Internet or a private enterprise network that connects more than one location. The network (120) may be any combination of the above networks, other known network, or any combination of network types.

In one or more embodiments of the invention, the network (120) allows the IHSs (e.g., 100A-100N) to communicate with each other and other external computing devices such as, but not limited to, a client (130), a bare metal orchestrator (140) and other components such as backup agents (not shown) and storage devices (not shown). The network (120) may be a high-speed internal network and/or comprise part of an external network (e.g., 120).

In one or more embodiments of the invention, the network (120) may comprise of a plurality of different networks and network types. A network (e.g., 120) may refer to an entire network, or any portion thereof (e.g., a logical portion of the devices within a topology of devices). A network (e.g., 120) may comprise of a data center network, a wide area network, a local area network, a wireless network, a cellular phone network, and/or any other suitable network that facilitates the exchange of information from one part of the network to another. A network (e.g., 120) may be located at a single physical location or be distributed at any number of physical sites. In one or more embodiments, a network (e.g., 120) may be coupled, or overlap, at least in part, with the Internet.

In one or more embodiments, although shown separately in FIG. 1A, the network (120) may comprise of any number of devices within any components of the system, as well as devices external to, or between, such components of the system. In one or more embodiments, at least a portion of such devices are network devices (not shown). A network device is a device that comprises and/or is operatively connected to persistent storage (not shown), memory (e.g., random access memory (RAM)) (not shown). A network device may also comprise of one or more processor(s) (e.g., integrated circuits) (not shown), and at least one physical network interface; which may provide connections (i.e., links) to other devices (e.g., computing devices, other network devices, etc.).

In one or more embodiments, a network device also comprises of any number of additional components (not shown), such as: network chips, field programmable gate arrays (FPGAs), application specific integrated circuits (ASICs), indicator lights (not shown), fans (not shown), etc. A network device may comprise of any other components without departing from the invention. Examples of a network device include, but are not limited to, a network switch, a router, a multilayer switch, a fibre channel device, an InfiniBand® device, etc. A network device is not limited to the aforementioned specific examples.

The network (e.g., 120) supports (or otherwise enables) components such as the IHSs (e.g., 100A-100N), the bare metal orchestrator (140) and clients (e.g., 130) to communicate using one or more streams. Any particular communication may have one or more streams assigned to it, with a maximum number of streams being preconfigured as a consequence of the network's design. Each stream has a maximum throughput, which is the maximum amount of data that may be sent between two components during a period of time, given network conditions. The total number of streams that may be used is dependent on the capabilities of the network and components, as well as the total throughput. Each stream utilizes part of the total bandwidth. Thus, when more streams are applied, each stream has a lower total throughput.

In one or more embodiments of the invention, assets, such as data, files, folders, applications and/or notifications, may be shared or transferred back and forth between the client (e.g., 130), the IHSs (e.g., 100A-100N), and the bare metal orchestrator (140). Any data related to an asset, such as its files and folders, may be stored in the client's storage (not shown). In one or more embodiments, the clients (e.g., 130) may provide a user interface allowing a user and/or administrator to receive notifications from the bare metal orchestrator (140).

The clients (e.g., 130) may interact with the IHSs (e.g., 100A-100N). For example, the clients (e.g., 130) may utilize application services provided by the IHSs (e.g., 100A-100N). When the clients (e.g., 130) interact with the IHSs (e.g., 100A-100N), data that is relevant to the clients (e.g., 130) may be stored on one or more of the IHSs (e.g., 100A-100N). Additionally, the clients (e.g., 130) may include functionality to use services provided by the IHSs (e.g., 100A-100N). For example, the clients (e.g., 130) may host local applications that interact with applications hosted by the IHSs (e.g., 100A-100N).

In one or more embodiments of the invention, the client (130) is implemented as a computing device (see e.g., FIG. 3). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage that, when executed by the processor(s) of the computing device, cause the computing device to perform the functionality of the client (130) described throughout this application.

In one or more embodiments of the invention, one or more of the clients (130) interacts with the bare metal orchestrator (140) to determine the changes that are needed to either one or more IHSs or the network (120), such as those described in more detail below with regards to the method shown in FIG. 2.

The bare metal orchestrator (140) is an infrastructure monitoring solution that configures and monitors the IHSs (e.g., 100A-100N). The bare metal orchestrator (140), as will be described in more detail with respect to the methods shown in FIG. 2, produces recommendations and/or implements the recommendations for configuring the IHS to maintain a reliable connection between the RAC, IHS, and the connected network (e.g., 120), even when the operating system (OS), or other element of the IHS, is failing.

In one or more embodiments of the invention, the bare metal orchestrator (140) may be located remotely For example, the bare metal orchestra may be located in, but not limited to, a manufacturer's datacenter, a cloud environment, or other location geographically separated from the IHSs (e.g., 100A-100N). In one or more other embodiments of the invention, it may be located in the same datacenter and/or location as the one or more of IHSs (e.g., 100A-100N) and/or the one or more clients (e.g., 130).

In one or more embodiments of the invention, the bare metal orchestrator (140) is implemented as a computing device (see e.g., 300, FIG. 3). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage that, when executed by the processor(s) of the computing device, cause the computing device to perform the functionality of the bare metal orchestrator (e.g., 140) described throughout this application.

In one or more embodiments of the invention, the bare metal orchestrator (e.g., 140) is implemented as a logical device. The logical device may utilize the computing resources of any number of computing devices and thereby provide the functionality of the bare metal orchestrator (e.g., 134) described throughout this application.

Figure 1B:
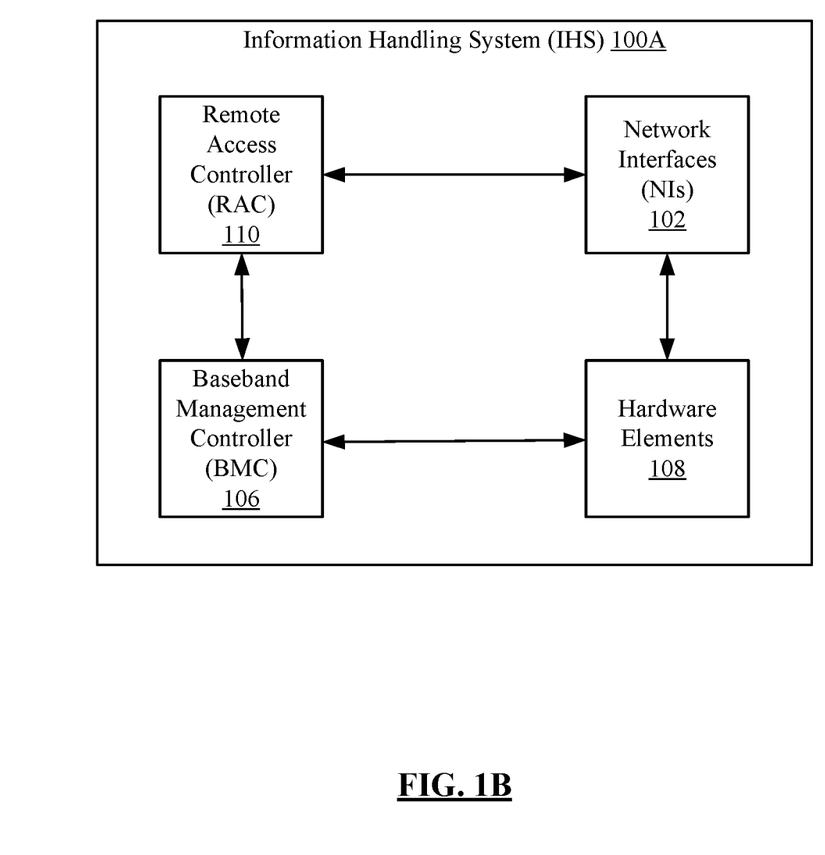
FIG. 1B shows a detailed diagram of an information handling system (IHS) in accordance with one or more embodiments of the invention.

Turning now to FIG. 1B, FIG. 1B shows a diagram of an information handling system (IHS) (100A) that, in accordance with one or more embodiments of the invention, includes various elements including a remote access controller (RAC) (110). The IHS (100A) is similar to the IHSs (e.g., 100A-100N) described above with regards to FIG. 1A. The IHS (e.g., 100A) hosts one or more applications and/or other processes. The IHS (100A) includes one or more hardware elements (108), at least one NI (102), the RAC (110), and a baseboard management controller (BMC) (106). The IHS (100A) may include more or less components then shown in FIG. 1B without departing from the invention.

In one or more embodiments of the invention, the IHS (100A) may host production hosts and/or virtual machines (VMs) that host one or more applications, web services, and/or databases. Each of the IHSs (e.g., 100A) may host any number of production hosts and/or VMs that, in turn, host any number of applications.

In one or more embodiments of the invention, the IHS (100A) may be implemented as computing devices (e.g., 300, FIG. 3). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the IHS (e.g., 100A) described throughout this application.

The IHS (100A), in one or more embodiments of the invention, includes one or more hardware elements (108). The hardware elements (108) may comprise of processors, memory, storage device and other elements. The hardware elements (108) may also refer to the software or firmware that is needed for the operation of the hardware elements (108) as well as the IHS (100A) in general. The hardware elements (108) may be physical devices or may be implemented as a logical device. The logical device may utilize the computing resources of any number of computing devices and thereby provide the functionality of the hardware elements (e.g., 108) described throughout this application.

In one or more embodiments, the hardware elements interact with a baseboard management controller (BMC) (106). The BMC is a specialized microcontroller or other component that manages the interface between system management software, hardware elements, and other devices (such as the RAC (110), and network interfaces (102)).

In one or more embodiments of the invention, the BMC (106) and hardware elements (108) communicate and interact with the remote access controller (RAC) (110). The RAC (110) is an out-of-band management platform that may be on a separate expansion card, or integrated into the main board. The RAC (110) interfaces with the BMC (106), and may be based on the intelligent platform management interface (IPMI), which allows for communication between a user/administrator and the BMC through a LAN or other network. In one or more embodiments, the RAC connects to the network through a network interface (NI) (e.g., 102). In one or more embodiment of the invention, the RAC (as will be described in more detail in FIG. 1C), includes one or more of its own network interfaces (NI) (102). Alternatively, it may share the NIs (102) that are a part of the general IHS (100A).

In one or more embodiments of the invention, the information handling system (100A) includes one or more network interfaces (NI) (e.g., 102). These may be stand-alone interfaces or may be part of one or more of the hardware elements (e.g., 108) and/or RAC (110), as will be described in more detail below with regards to FIG. 1C. In general, the IHS (100A) will include more than one NI (102), so that if one NI fails, the traffic from the network (e.g., 120, FIG. 1A) may be moved to a different NI. The addition of multiple NIs (e.g., 102) provides other advantages such as, but not limited to, allowing for faster interaction with the network (e.g., 120, FIG. 1A).

The NI (e.g., 102) is a physical controller and/or card that connects the various components of the IHS (100A) with the network (e.g., 120, FIG. 1A). The NI forms the hardware for communicating at the physical layer and data link layer. The NI allows for communications over a local area network (LAN), a wide area network (WAN), as well as potentially the Internet. While the NI may communicate wirelessly, in one or more embodiments of the invention, the NI (e.g., 102) is connected to the network (e.g., 120, FIG. 1A), which may comprise of one or more switches and other components, by one or more cables (not shown). The cables may comprise of conductors or fiber optics. Other combinations of NIs (e.g., 102), switches (not shown), routers (not shown), cables (not shown), and other network components may be used without departing from the invention.

When there is more than one NI (e.g., 102) present, depending on how the cables are configured, the NIs (e.g., 102) may work together or separately. When working together, they may be configured with teaming and have the ability to allow for failover. The NIs (e.g., 102) may be configured to operate in multiple modes, and must be configured appropriately depending on the type and/or level of service desired.

Figure 1C:
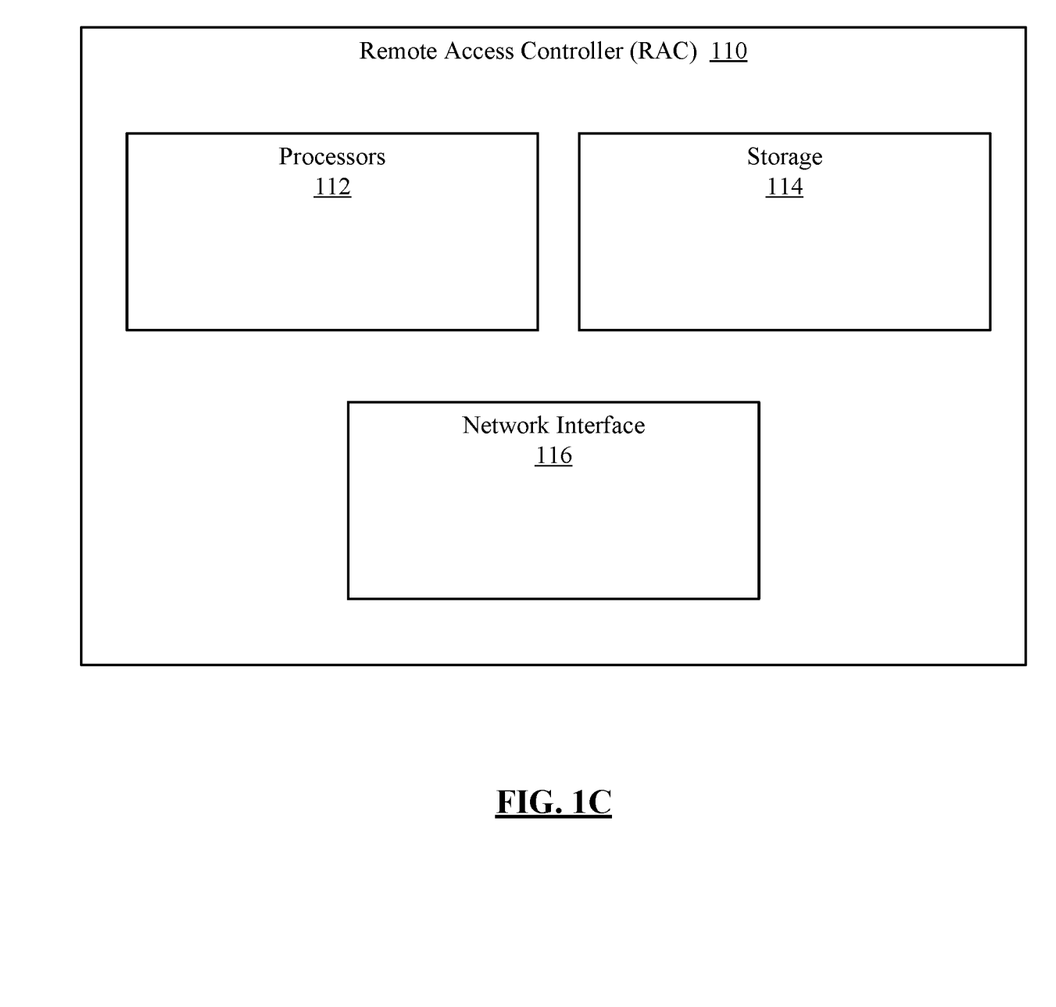
FIG. 1C shows a detailed diagram of a remote access controller (RAC) in accordance with one or more embodiments of the invention.

Turning to FIG. 1C, the remote access controller (RAC) (110), will be described in more detail. FIG. 1C shows the details of the remote access controller (RAC) (110) of FIG. 1B in more detail. The RAC is shown with processors (112), storage (114) and a NI (116). The NI (116) may be part of the RAC (110) or may be one or more of the NIs (e.g., 102, FIG. 1B) of the IHS (e.g., 100A, 1B) which are assigned to provide network connectivity to the RAC (110). The RAC may include more or less parts than shown in FIG. 1C, without departing from the invention.

As described above with regards to FIG. 1B, the RAC (110) allows for remote access and management of the IHS (e.g., 100, FIG. 1B) either via the BMC (e.g., 106, FIG. 1B) or directly with one or more of the hardware elements (108, FIG. 1B). The RAC (110) allows for the remote management by utilizing the NI (116).

Frequently, RACs (110) either share the IHS's NIs (e.g., 102, FIG. 1B) or has a dedicated NI (116). However, sharing the NIs with the rest of the IHS may potentially cause the RAC to be inoperative or to fail, due to the shared NI (e.g., 102, FIG. 1B) not being available for various reasons. Therefore, the RAC (110) having its own dedicated NI (116) helps to avoid this.

The RAC/NI may be configured in a plurality of modes such as, but not limited to, shared and dedicated modes. During normal operation, a user/administrator will prefer that the RAC/NI be set in a shared mode, as this provides certain advantages during normal operation. However, if the RAC/NI is configured in a shared mode instead of a dedicated mode, the RAC will not work during certain events, such as an OS hang or prior to the OS booting.

In order to overcome this issue, one or more embodiments of the invention seeks to learn the signs of when an event such as an OS hang may occur and recommend and/or automatically switch the RAC/NI to a dedicated mode prior to such an event occurring. While this may reduce productivity (e.g., because the host OS may not be able to use the RAC NI (116), it will ensure that the RAC is functionable if the OS hangs or other problems occur. This allows a user, administrator, and/or manufacturer to make changes remotely and attempt to alleviate the source of the problem that is causing an OS hang or other issues with the IHS. The method of making the determination to switch to a dedicated mode is described in more detail below with regards to the method shown in FIG. 2.

While the above steps may restore functioning to the system, there may still be a need for other actions to restore the system and/or restore normal functioning. In one or more embodiments of the invention, a user may additionally be notified to change/re-configure cabling and/or repair the network (such as one or more bad switches), in order to allow for proper functioning of the RAC in the dedicated mode. Other recommendations and configurations may be performed without departing from the invention.

While FIGS. 1A-1C show a configuration of components, other configurations may be used without departing from the scope of embodiments described herein. For example, although FIG. 1B shows all components of an IHS as part of one device, any of the components may be grouped into sets of one or more components which may exist and execute as a part of any number of separate and operatively connected devices. Accordingly, embodiments disclosed herein should not be limited to the configuration of components shown in FIGS. 1A-1C.

Figure 2:
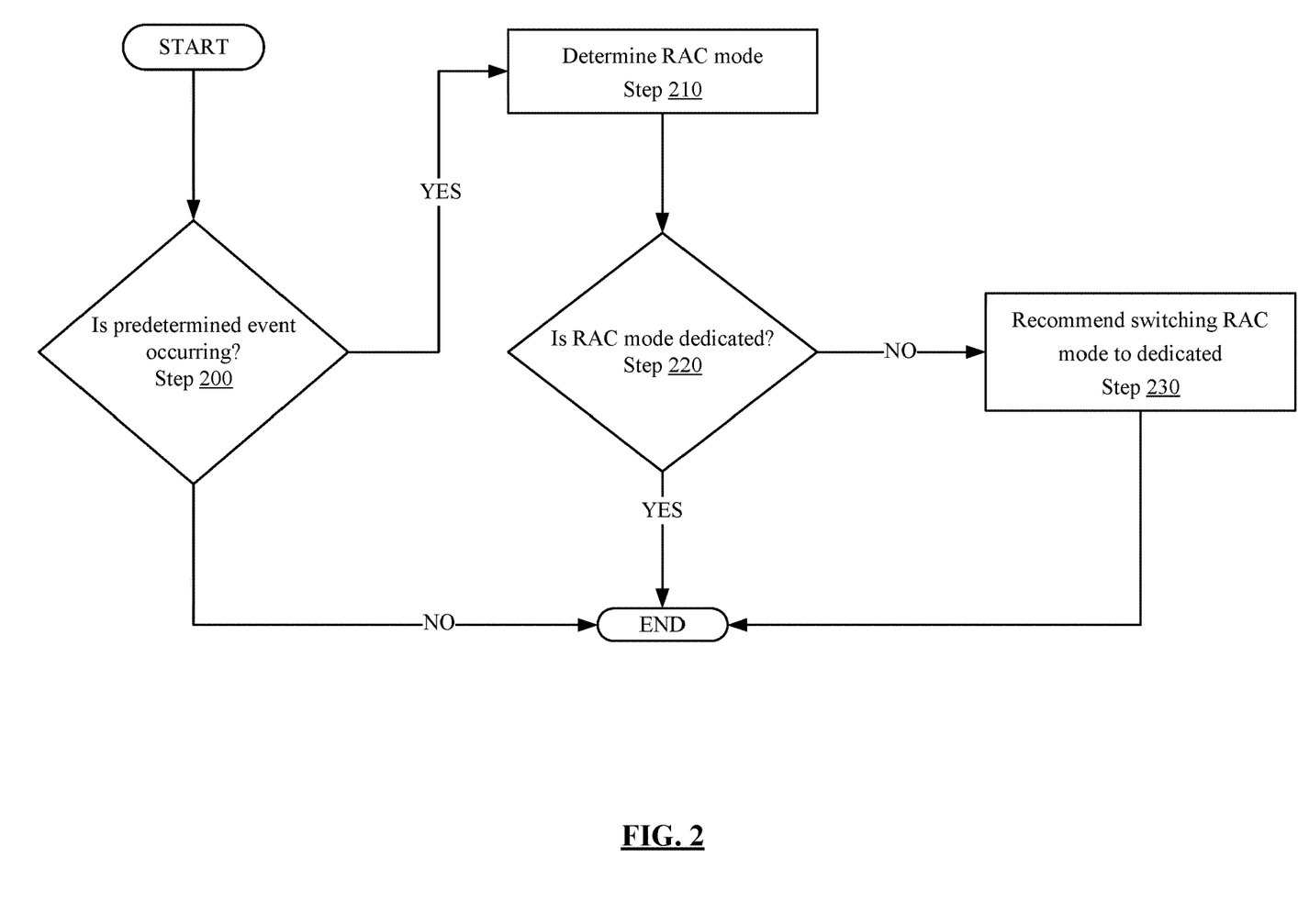
FIG. 2 shows a flowchart of a method for recommending changes to a system in accordance with one or more embodiments of the invention.

FIG. 2 shows a flowchart describing a method for recommending changes to an IHS having a RAC. The method may be performed, for example, by the bare metal orchestrator (e.g., 140, FIG. 1A), one or more IHSs (e.g., 100A-100N, FIG. 1A) and/or the RAC (e.g., 110, FIG. 1B). Any other part of the system shown in FIGS. 1A-1C may perform the method, without departing from the invention. While FIG. 2 is illustrated as a series of steps, any of the steps may be omitted, performed in a different order, additional steps may be included, and/or any or all the steps may be performed in a parallel and/or partially overlapping manner without departing from the invention.

In step 200, a determination is made if a predetermined event is occurring. The determination may be made by monitoring telemetry or other sources of information such as, but not limited to, logs received from the IHS. The information obtained, such as telemetry, is used for detecting when a potential failure of a RAC, OS, or IHS in general may occur. The monitoring may be performed continuously, periodically, and/or manually may be done when a user, administrator, or process of the IHS and/or bare metal orchestrator suspects that the IHS, or one or more of its component elements, may need reconfiguring and/or that the IHS is or soon will be in a failure state.

The predetermined event, in one or more embodiments of the invention, may be set by a user, administrator, or manufacturer. Alternatively, in one or more embodiments of the invention, machine learning (as will be described next), monitors the IHS and determines over time one or more events that have a significant probability of causing the IHS, RAC, or other component of the system to fail. Such event may be, in non-limiting examples: device workload reaching a threshold, device responsiveness degrading to a threshold value, certain events such as upgrades to one or more processes/applications. Other events and/or thresholds may be used without departing from the invention.

In one or more embodiments, the machine learning is performed by the RAC (e.g., 110, FIG. 1B) alone or in combination with the BMC (e.g., 106, FIG. 1B). When the RAC and/or BMC detects that a predetermined event is occurring in step 200 it signals the bare metal orchestrator (e.g., 140, FIG. 1A) to make recommendations to allow for the RAC to continue to function even if a failure such as an OS hang occurs. While the monitoring and determining of the predetermined event is described as being performed by the RAC and/or BMC, in one or more embodiments of the invention, it may be performed by the bare metal orchestrator (e.g., 140, FIG. 1A), or any other part of the system described above in FIGS. 1A-1C, without departing from the invention.

The RAC (e.g., 110, FIG. 1A), and/or other components such as the bare metal orchestrator (e.g., 140, FIG. 1A), analyze telemetry and logs over time to determine the potential events that may lead to an IHS/RAC/OS failing. Specifically, in one or more embodiments of the invention, the method determines those events that are most likely to lead to an OS hanging or failing. This may be done by using machine learning and specifically multiple linear regression to determine such things as a device workload threshold, device responsiveness degradation threshold, and/or specific events such as, but not limited to, upgrades to certain processes/applications that may cause a failure. The predetermined thresholds and/or events may be any amount or event that is deemed to have a significant probability to lead to an OS failure or other failure that would require the RAC to potentially cause a loss of connectivity with the RAC.

In one or more embodiments of the invention, the method may use multiple linear regression to determine a threshold (for example, a threshold workload or responsiveness degradation). Multiple linear regression is a type of modeling for producing a model of the relationship between a scalar response and multiple explanatory variables. Multiple linear regression may be used to produce a predictive model to an observed set of data values with limited error. A basic model may be calculated using the following formula for making a model with multiple linear regression:

$$Y_i = B_0 + B_1 X_{i1} + B_2 X_{i2} + \ldots B_p X_{ip} + E_i.$$

Where Y is the ith observation of the dependent variable $X_{ij}$, $B_j$ are parameters to be estimated and $E_i$ is the distributed normal error.

In order to determine an event/threshold, the various values for the RAC, network, and IHS are inputted into the multiple linear regression to determine the predicted value of an ideal threshold where it is statistically more likely that a failure in the IHS/RAC/Network may occur. Other machine learning methods for determining the threshold may be used without departing from the invention, as well as having a user/administrator/manufacturer input values for the threshold without the use of machine learning.

Alternatively, or in addition to, a user or administrator may determine a recommendation. The recommendation may be determined by any method without departing from the invention. If it is determined in step 200 that the predetermined event is occurring, the method proceeds to step 210. Otherwise, if it is determined in step 200 that the predetermined event is not occurring, and periodic monitoring may continue, and the method may end.

In step 210, the RAC mode is determined. In step 220, if the RAC mode is determined to be dedicated, the method again ends and/or periodic monitoring is continued. If, however, in step 220, it is determined that the RAC mode is not dedicated, for example, the RAC is in shared mode, the method proceeds to step 230.

In step 230, the recommendation is made to switch the RAC mode to dedicated. In one or more embodiments of the invention, this recommendation is then carried out by the bare metal orchestrator, which causes the RAC to switch to dedicated mode when the cabling and other related physical components of the RAC are configured to allow the RAC to operate in a dedicated mode. In one or more embodiments of the invention, if the physical components (such as cabling) are not configured, or if a user/administrator has a preference to not perform automatic switching, the user and/or administrator is notified, for example with a graphical user interface, other information display, email, SMS alert, or other means of notifying the user/administrator to carry out the necessary changes needed to place the RAC is a dedicated mode.

Once the recommendations are made and/or implemented in step 230, the method may end and/or periodic monitoring is continued. The method may end after any of steps 200, 220, and 230 when either the predetermined event is not occurring (step 200), the RAC mode is in a dedicated mode (step 220), or the RAC mode is recommended to be switched into a dedicated mode (step 230).

In one or more embodiments of the invention, the IHS is continuously monitored, and at least step 200 is periodically performed. After step 230 is implemented, a user or automated system may choose to switch the RAC back to a shared mode, or other useful mode when the predetermined event is not occurring (for example, in a non-limiting example, if an update that potentially causes OS hangs is successfully completed).

Additionally, as discussed above, embodiments of the invention may be implemented using computing devices. FIG. 3 shows a diagram of a computing device in accordance with one or more embodiments of the invention. The computing device (300) may include one or more processors (302), non-persistent storage (304) (e.g., volatile memory, such as random access memory (RAM), cache memory), persistent storage (306) (e.g., a hard disk, an optical drive (such as a compact disk (CD) drive or digital versatile disk (DVD) drive), a flash memory, etc.), a communication interface (312) (e.g., Bluetooth interface, infrared interface, network interface, optical interface, etc.), an input device (310), an output device (308), and numerous other elements (not shown) and functionalities. Each of these components is described below.

In one embodiment of the invention, the processor(s) (302) may be an integrated circuit for processing instructions. For example, the processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network), and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output device(s) (308) may be the same or different from the input device(s) (310). The input and output device(s) (308, 310) may be locally or remotely connected to the processor(s) (302), non-persistent storage (304), and persistent storage (306). Many distinct types of computing devices exist, and the input and output device(s) may take other forms.

One or more embodiments of the invention may be implemented using instructions executed by one or more processors of the IHS. Further, such instructions may correspond to computer readable instructions that are stored on one or more non-transitory computer readable mediums.

The one or more embodiments of the invention described above may improve the functioning of the IHS and the ability to use an RAC for troubleshooting and correcting problems with the IHS, even when the IHS is off-line or experiencing OS failure. In one or more embodiments of the invention, a bare metal orchestrator, which is separate from the IHS, monitors the IHS and uses machine learning to determine when to switch the RAC from shared mode to dedicated mode, so that the RAC is in a dedicated mode when it is probable that the IHS will fail. By having the RAC switch from shared mode to a dedicated mode when system/OS failure is probable, this allows the RAC to be available even when the OS and/or other elements of the IHS are not functioning.

The problems discussed above should be understood as being examples of problems solved by embodiments of the invention disclosed herein, and the invention should not be limited to solving the same/similar problems. The disclosed invention is applicable to address a range of problems beyond those discussed herein.

While the invention has been described with respect to a limited number of embodiments, those skilled in the art, having the benefit of this disclosure, will appreciate that other embodiments may be devised which do not depart from the scope of the technology as disclosed herein. Accordingly, the scope of the invention should be limited only by the attached claims.

What is claimed is:

1. A method for managing an information handling system, the method comprising:
    retrieving telemetry and system logs from a remote access controller of the information handling system;
    making a first determination, using the telemetry and system logs, that a predetermined event is occurring that is indicative of a process that causes an operating system of the information handling system to fail, wherein the predetermined event is identified as indicative of a process that causes the operating system to fail using multiple linear regression, wherein the predetermine event comprises of the information handling system's workload reaching a threshold and the information handling system's responsiveness degrading to a threshold value;
    making a second determination that the remote access controller is not in a dedicated mode;
    transmitting, in response to the second determination, a recommendation to a user of the information handling system, wherein:
        the recommendation specifies switching the remote access controller to the dedicated mode, and
        the recommendation is transmitted to the user via a graphical user interface (GUI);
    receiving a response to the recommendation from the user; and
    switching the remote access controller to the dedicated mode prior to the operating system of the information handling system failing.

2. The method of claim 1, wherein the process is an application upgrade.

3. The method of claim 1, wherein the recommendation further comprises changing a configuration of cables connecting the information handling system to a network.

4. A non-transitory computer readable medium comprising computer readable program code, which when executed by a computer processor enables the computer processor to perform a method for managing an information handling system, the method comprising:
    retrieving telemetry and system logs from a remote access controller of the information handling system;
    making a first determination, using the telemetry and system logs, that a predetermined event is occurring that is indicative of a process that causes an operating system of the information handling system to fail, wherein the predetermined event is identified as indicative of a process that causes the operating system to fail using multiple linear regression, wherein the predetermine event comprises of the information handling system's workload reaching a threshold and the information handling system's responsiveness degrading to a threshold value;

making a second determination that the remote access controller is not in a dedicated mode;
transmitting, in response to the second determination, a recommendation to a user of the information handling system, wherein:
 the recommendation specifies switching the remote access controller to the dedicated mode, and
 the recommendation is transmitted to the user via a graphical user interface (GUI);
receiving a response to the recommendation from the user; and
switching the remote access controller to the dedicated mode prior to the operating system of the information handling system failing.

5. A system comprising:
an information handling system comprising:
 a remote access controller; and
 a bare metal orchestrator comprising:
  at least one processor; and
  at least one memory that includes instructions, which when executed by the processor, performs a method for managing the information handling system, the method comprising:
   retrieving telemetry and system logs from a remote access controller of the information handling system;
   making a first determination, using the telemetry and system logs, that a predetermined event is occurring that is indicative of a process that causes an operating system of the information handling system to fail-is occurring, wherein the predetermined event is identified as indicative of a process that causes the operating system to fail using multiple linear regression, wherein the predetermine event comprises of the information handling system's workload reaching a threshold and the information handling system's responsiveness degrading to a threshold value;
   making a second determination that the remote access controller is not in a dedicated mode; and
   automatically switching, in response to the second determination, the remote access controller to the dedicated mode prior to the operating system of the information handling system failing.

6. The system of claim 5, wherein a host operating system on the information handling system cannot utilize a network interface of the remote access controller when the remote access controller is in the dedicated mode.

7. The system of claim 5, wherein the bare metal orchestrator initiates the automatic switching.

* * * * *